Dec. 6, 1960

R. E. RIEBS 2,963,614

ELECTRICAL PROTECTIVE DEVICE

Filed Dec. 23, 1957

INVENTOR.
Richard E. Riebs
BY Lee H. Kaiser
Attorney

Dec. 6, 1960   R. E. RIEBS   2,963,614
ELECTRICAL PROTECTIVE DEVICE
Filed Dec. 23, 1957   2 Sheets-Sheet 2

INVENTOR.
Richard E. Riebs
BY
Lee W. Kaiser
Attorney

United States Patent Office 2,963,614
Patented Dec. 6, 1960

2,963,614

ELECTRICAL PROTECTIVE DEVICE

Richard E. Riebs, Hales Corners, Wis., assignor to Mc-Graw-Edison Company, Milwaukee, Wis., a corporation of Delaware Filed Dec. 23, 1957, Ser. No. 704,597

5 Claims. (Cl. 313—161)

This invention relates to an electrical protective device and particularly to a device for the protection of series capacitors in electrical systems.

Capacitors series connected with a load are used in electrical transmission and distribution systems for voltage regulation. Since the capacitors are series connected, all the load current passes through them and the voltage drop across their terminals is a function of the load current. A current which results in a voltage drop across the capacitor exceeding several times its rated voltage even momentarily may damage the capacitor, and it is therefore necessary to provide means to protect series capacitors against overvoltages during fault conditions. This protection generally takes the form of a device that will shunt the current around the capacitor when the evoltage across the capacitor exceeds a predetermined value. The magnitude of the overvoltage which a capacitor can safely withstand decreases rapidly as the duration of the overvoltage increases and, consequently, the capacitor should be by-passed during the first half cycle of fault current. No mechanical switch can operate fast enough to protect a capacitor, and for this reason it is customary to utilize a protective device comprising a pair of spaced electrodes of an arc resistant material in shunt with the capacitor, thereby forming an air gap which will break down and bypass the capacitor when subjected to an overvoltage which may damage the capacitor. When it was desired heretofore to protect series capacitors from overvoltages in the range below 500 volts, air gap devices having conventional electrodes could not be utilized because the electrode spacing required to provide such low breadown voltage is so infinitesimal as to make construction thereof impracticable. Consequently it has not been satisfactory to connect the air gap directly across the terminals of the capacitor, and auxiliary gaps and transformers have been used to initiate breakdown of a main gap which is set for a considerably higher voltage than can be permitted to appear across the capacitor. The electrodes of such prior art air gap discharge devices for series capacitor protection were incapable of sustaining current for an extended period of time, and means were required for shunting the gap and transferring the arc current to another path immediately after the gap had broken down. Such means usually took the form of a relatively expensive thermal or magnetic contactor, or an automatic circuit breaker, that closed to bypass the gap and capacitor and opened after the fault had cleared to restore the capacitor to service. Thus, the protective equipment which has heretofore been used for series capacitors has necessitated the use of transformers, auxiliary gaps, and contactors and has been relatively complicated and expensive.

Prior art air gap protective devices have often been unreliable in that erosion of the electrodes due to arcing changes the physical dimensions of the gap, thereby changing its voltage breakdown characteristics. Also, the breakdown voltage of piror art devices having electrodes exposed to the atmosphere undesirably changes with variations in ambient atmospheric pressure and humidity.

Air gaps utilized as lightning arresters are unsuitable for many applications because once the arc has been initiated, the gap will continue to arc and thereby pass system current to ground until the flow of current is interrupted by opening the power line.

It is an object of the invention to provide a new and improved voltage limiting device for the protection of the components of an electric power system.

It is another object of the invention to provide a new and improved voltage limiting device for protecting series-connected elements in an electric power circuit against overvoltages due to the flow of fault current therethrough.

Another object of the invention is to provide a discharge protective device which has a stable and relatively low breakdown potential.

Still another object is to provide such a discharge protective device which can be constructed to have an accurately predetermined breakdown potential in the range of voltages below 500 volts.

It is a further object of the invention to provide a discharge protective device wherein the breakdown potential may be accurately predetermined.

Another object of the invention is to provide a protective, voltage limiting, discharge device which is self clearing.

Still another object of the invention is to provide a voltage limiting discharge device in which the breakdown potential is not affected by humidity and atmospheric pressure.

Another object of the invention is to provide an electrical protective discharge device having mercury electrodes wherein no starting electrodes are required.

A still further object of the invention is to provide an electrical protective discharge device which eliminates any hazard of fire.

It is an object of the preferred embodiment of the invention to provide a new and improved voltage limiting device for the protection of series connected capacitors in an electric power circuit. A still further object of this embodiment is to provide an improved protective device for series capacitors which obviates the necessity for expensive thermal or magnetic contactors or automatic circuit breakers which were required with prior art apparatus to shunt the protective gap and transfer the arc current to another path.

Still another object of the invention is to provide a protective gap device wherein no erosion of the electrodes can occur due to arcing which might change the physical dimensions of the gap as occurred in prior art gap devices.

A still further object of the invention is to provide a series capacitor protective gap device which will restore the capacitor to service within one half cycle after the fault has cleared.

These and other objects and advantages of the invention will be apparent from the following detailed description when taken in conjunction with the accompanying drawing wherein.

In accordance with one of its aspects, the above stated objects of the invention are accomplished in a preferred embodiment of the invention by apparatus wherein a pair of mercury electrodes electrically insulated one from the other and providing a low voltage gap therebetween are enclosed within an envelope containing a low pressure gas which is chemically inert with respect to mercury. The gas provides a stable, relatively low breakdown potential which is a function of electrode spacing and the pressure of the gas, and by properly selecting the pressure inside the envelope it is possible to accurately predetermine the breakdown potential over a range from several hundred to many thousands of volts. The relatively low breakdown potential of the gas eliminates the requirement for a starting electrode to initiate the discharge. There is no change in electrode spacing due to erosion of the electrodes themselves or due to the depositing of electrode material on the walls of the envelope, because the mercury vaporized during arcing between electrodes will condense on the walls and return to the mercury pools. The device is self clearing at the end of each half cycle because the mercury ions formed during arcing rapidly de-ionize. The arc is totally enclosed, thereby completely eliminating the fire hazard. Further, the voltage across the enclosed arc and, consequently, the arc energy, are much lower than in an arc drawn in a gap exposed to the atmosphere.

Figure 1:
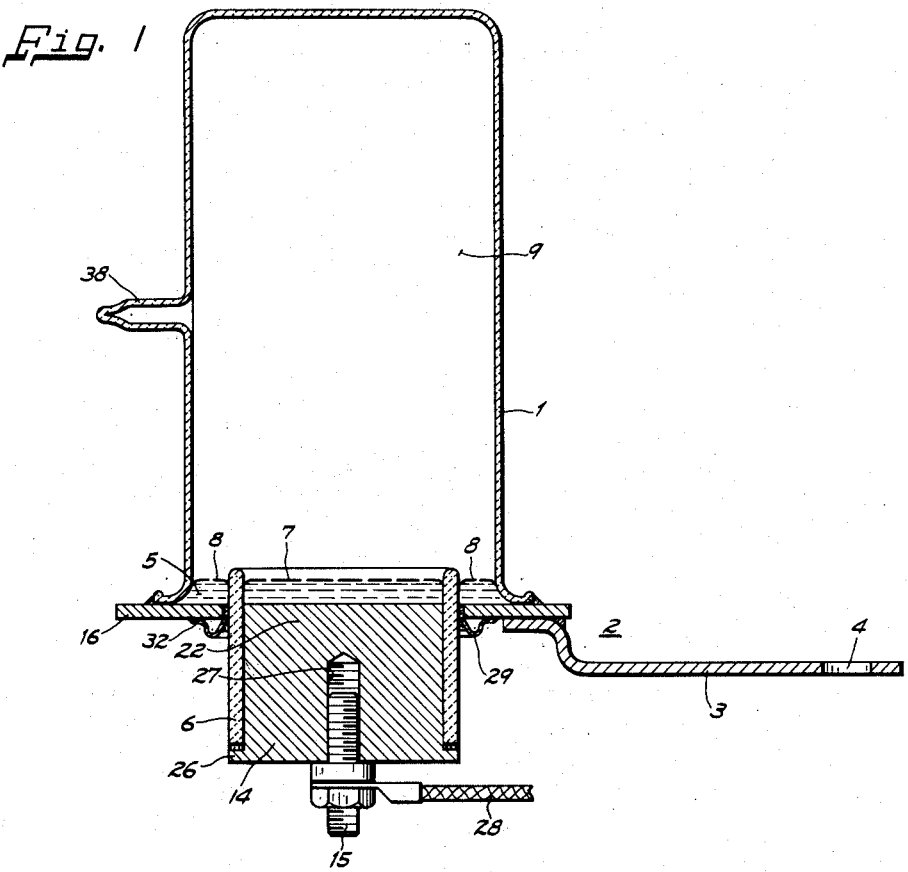
Fig. 1 is a vertical sectional view through a preferred embodiment of the invention.

Referring to the drawing, the preferred embodiment of the electrical protective device of the invention shown in Fig. 1 includes a hollow cylindrical shell 1 of a suitable insulating material such as glass having its longitudinal axis disposed vertically and a gap assembly 2 disposed at the lower end of the shell 1, the gap assembly 2 and shell 1 forming a sealed chamber. A metallic mounting bracket 3 secured by suitable means, such as solder, to the gap assembly 2 serves as one electrical conductor to the protective device of the invention and is provided with an aperture 4 adjacent the free end thereof to permit direct mounting of the protective device of the invention on the terminal of a series capacitor (not shown).

Electrically conductive fluid 5, preferably mercury, is disposed within the sealed chamber, and electrical insulating means divide the mercury into two pool electrodes insulated one from the other. In the preferred embodiment shown in Fig. 1, the gap assembly 2 sealing the open end of envelope 1 includes a tubular barrier 6 of suitable insulating material such as a ceramic having high thermal resistance dividing the mercury 5 into an inner circular pool electrode 7 radially inward from tubular barrier 6 and an outer annular pool electrode 8 electrically isolated from inner pool 7 and disposed between tubular insulating barrier 6 and the inner periphery of shell 1. A gaseous substance 9 filling the sealed chamber is in fluid communication with the pool electrodes 7 and 8, and preferably the gas 9 is chemically inert with respect to the electrically conductive fluid 5. It will be apparent that the shortest path between inner and outer pools 7 and 8 through said gas 9 across the upper edge of insulating barrier 6 is a predetermined distance and forms a discharge gap having a predetermined breakdown voltage.

The gap assembly 2 also includes conductor means in electrical contact with the inner mercury pool electrode 7 and permitting electrical connection thereto from the exterior of the sealed chamber, said conductor means including a metallic conductor member 14 covered by the mercury 5 in the inner pool electrode 7. The gap assembly 2 also includes an annular metallic base member 16 covered by and in electrical contact with the outer mercury pool electrode 8 and permitting electrical connection thereto from the exterior of the sealed chamber. The base member 16 surrounds the tubular insulating barrier 6 and is affixed by any well known ceramic-to-metal bonding means to the shell 1 which preferably is of glass having approximately the same coefficient of expansion as the material of base 16.

The metallic conductor member 14 has a cylindrical body portion 22 disposed within and filling the axial opening in insulating barrier 6 and an annular radially extending flange portion 23 at its lower end. The lower edge of insulating barrier 6 rests on flange portion 26 of conductor member 14 and is bonded thereto in fluid sealing relationship by any suitable ceramic-to-metal bonding means. The upper surface of the metallic conductor member 14 is preferably substantially coplanar with the upper surface of the base member 16.

The metallic conductor member 14 has an axial threaded hole 27 in the lower side of the body portion 22 into which is threaded one end of a conductor bolt assembly 15 to secure one end of a conductor 28 which may be electrically connected to the device to be protected.

The inner edge of an annular, channel-shaped, resilient metallic member 29 fits snugly around the insulating barrier 6 and is rigidly affixed by any well known ceramic-to-metal bonding means to the outer periphery of insulating barrier 6. The resilient member 29 also has an annular flange 32 around its outer edge which is affixed on base 16 in fluid sealing relation by suitable means such as solder.

The mercury of annular pool electrode 8 covers the disk-shaped base member 16 between the inner wall of the shell 1 and the outer periphery of the tubular insulating barrier 6 and the surface of mercury in outer pool electrode 8 is below the upper edge of the tubular insulating barrier 6. The mercury 5 forming inner pool electrode 7 is disposed on the inside of the tubular barrier 6 and above the metallic conductor member 14, the surface of the mercury being preferably coplanar with the surface of the mercury in outer pool 8. It is important that the upper surface of conducting member 14 and base 16 be completely covered with mercury 5 so that no arcing occurs to these members. The tubular insulating barrier 6 electrically insulates the mercury of outer pool 8 and base 16 from inner mercury pool electrode 7 and metallic conductor member 14 and is of sufficient axial length so that no arcing will take place between conducting members 14 and 16 externally of the shell 1. The tubular insulating barrier 6 is preferably a ceramic material having high temperature stability so that it will not be damaged by the high temperature of the arc. The base 16 and metallic conductor member 14 are preferably of material such as stainless steel which will not react with the mercury.

Because any mercury deposited on the interior walls of shell 1 during arcing will flow down the walls of the shell 1 and into the outer pool electrode 8, the shell 1 and the insulating barrier 6 are preferably so proportioned relative to each other that the area of the free surface of pool electrode 7 is equal to the area of the free surface of pool electrode 8. Consequently, the drop in height of mercury in the inner electrode 7 due to mercury lost to the outer electrode pool 8 during arcing will be equal to the rise in height of outer pool electrode 8, thereby maintaining the electrode spacing constant. This construction also prevents changes in electrode spacing if mercury were accidentally displaced from one pool electrode to the other.

The interior of the insulating shell 1 above the mercury 5 is filled with a gaseous substance 9 under low pressure which is chemically inert with respect to mercury. For example, argon, neon or hydrogen are suitable to accomplish the improved results of the invention. The shell 1 has a tubulation 38 which facilitates the evacuation of the shell 1, refilling it with the inert gas 9, and resealing. Since the pressure within the shell 1 is less than atmospheric, the forces acting on the device due to atmospheric pressure will tend to force the shell 1 and gap assembly 2 together and also tend to force the conductor member 14 against the insulating barrier 6, thereby aiding in the maintenance of the hermetic seal of shell 1.

Figure 6:
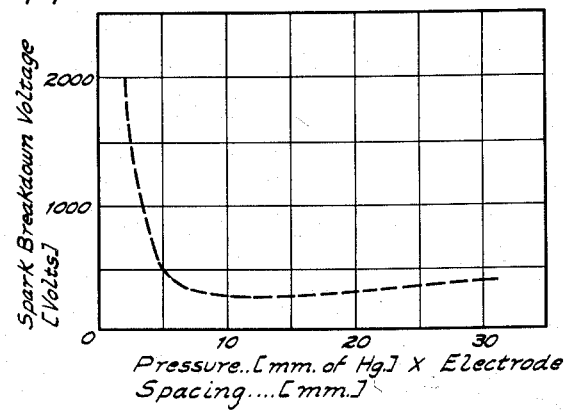
Fig. 6 shows variations in breakdown voltage of the insulating gas plotted against gas pressure times electrode spacing.

Because the electrical breakdown potential is a function of the pressure of the inert gas 9 and the electrode spacing and also because the distance between the mercury pool electrodes 7 and 8 over the insulating barrier 6 is a fixed value for any given embodiment, the breakdown potential can be accurately predetermined by varying the gas pressure in the sealed chamber. Referring now to Fig. 6 which shows a curve plotting breakdown potential in volts for hydrogen versus electrode spacing in mm. times gas pressure in mm. of mercury, it can be seen that if, for example, a breakdown potential of 400 volts is desired and the electrode spacing is 10 mm., the pressure of hydrogen in the sealed chamber 1 would have to be 30 (obtained from the curve of Fig. 6) divided by the electrode spacing of 10 mm. or a pressure of 3 mm. of mercury. While these values would vary with each particular gas filling the protective device, it can be readily seen that a wide range of breakdown potentials can be readily obtained.

The arc drawn between mercury pool electrodes 7 and 8 results in emission from the mercury surface, and the ionization of the mercury permits the device of the invention to carry large fault currents with only a relatively low voltage drop across the arc. Inasmuch as the voltage across the arc is very low, the arc energy (which is proportional to the product of arc current and arc voltage) is also low in comparison to the arc drawn in a conventional air discharge gap for series capacitor protection and, consequently, the arc drawn between mercury pools 7 and 8 is not self sustaining as in prior art air gap protective devices for series capacitor protection. The de-ionization time for mercury is never more than several hundred microseconds and, consequently, the arc clears on the first half cycle when the voltage developed across the series capacitor terminals is insufficient to break down the gas 9 within the sealed chamber. Inasmuch as the metallic conductor member 14 and base 16 are completely covered by the mercury pool electrodes, all of the arcing occurs between the surfaces of the mercury pools and no erosion of the metal conductor members 14 and 16 can occur. Consequently, the physical dimensions of the gap are constant and do not change with sustained arcing as occurred in prior art air gap discharge devices for series capacitor protection.

When the protective device of the invention is used for series capacitor protection, bracket 3 and conductor 28 are electrically connected across the capacitor terminals. If a dangerous overvoltage is developed across the capacitor terminals which exceeds the breakdown potential of the inert gas 9, an arc will be initiated between mercury pool electrodes 7 and 8, thereby bypassing the fault current around the capacitor. Prior art air gap protective devices were not self clearing, that is, the re-ignition voltage was considerably lower than the breakdown voltage. The protective device of the invention, however, is self clearing at the end of each half cycle because of the relatively low de-ionization time of the mercury which results in a re-ignition voltage being substantially the same as the breakdown voltage and, consequently, the protective device of the invention will cease to conduct immediately after fault current ceases, thus restoring the capacitor to the circuit. Similarly, in the operation of the device as an overvoltage protection means such as a lightning arrester, the protective device will cease to conduct when the voltage resulting from the lightning decays to a potential lower than that required to break down the inert gas 9 filling the sealed chamber, thus interrupting the sixty cycle follow current.

Inasmuch as the mercury pool electrodes are not damaged by the arc and the protective device of the invention is self clearing, use of the improved device of the invention for series capacitor protection obviates the need for expensive automatic circuit breakers or thermal or magnetic contactors which were necessary with prior art series capacitor protective devices to transfer the arc current to an alternate path. Further, inasmuch as the protective device of the invention is self clearing as soon as the fault disappears, the series capacitors are immediately restored to service and maximum system stability is obtained in comparison to prior art systems where usually several seconds elapsed after the fault disappeared before the capacitors were restored to service.

The gap between mercury pool electrodes 7 and 8 is totally enclosed and, therefore, the breakdown voltage is not variable with humidity and atmospheric pressure as in prior art protective devices for series capacitors. Inasmuch as no erosion of the pool electrodes can occur, and thus the electrode spacing cannot change, the breakdown potential of the protective device of the invention is stable regardless of the number of times that it is operated. Further, the voltage limiting device of the invention provides uniform breakdown characteristics in the ranges of potential below 500 volts where it was heretofore impossible to obtain adequate overvoltage protection with prior art air gap devices.

It is preferable that the volume of gas 9 in shell 1 be of such a magnitude that its temperature will not be materially affected by the arc. This insures that the heating of the protective device due to arc temperature will not change the pressure within the sealed chamber sufficiently to change the predetermined breakdown potential.

Figure 2:
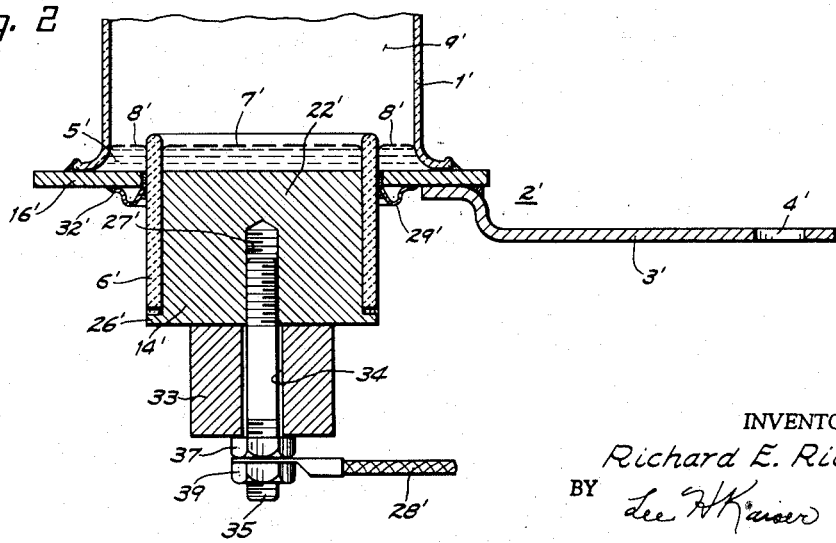
Fig. 2 is a partial view in vertical section of an alternative embodiment of the invention.

In an alternative embodiment of the invention shown in Fig. 2, many of the components are identical with elements of the preferred embodiment and are identified by the same reference numbers to which a prime (') has been added, and the description of these parts will not be repeated. A permanent magnet 33 is disposed below conducting member 14' and has an axial bore 34 for receiving a conductor bolt 35 threadably engaged within the axial tapped hole 27' in conductor member 14. The magnet 33 is secured to the gap assembly 2' by suitable means such as nut 37 threaded on bolt 35. A second nut 39 threaded on bolt 35 secures one end of a conductor 28' which may be electrically connected to the device to be protected.

Figure 3:
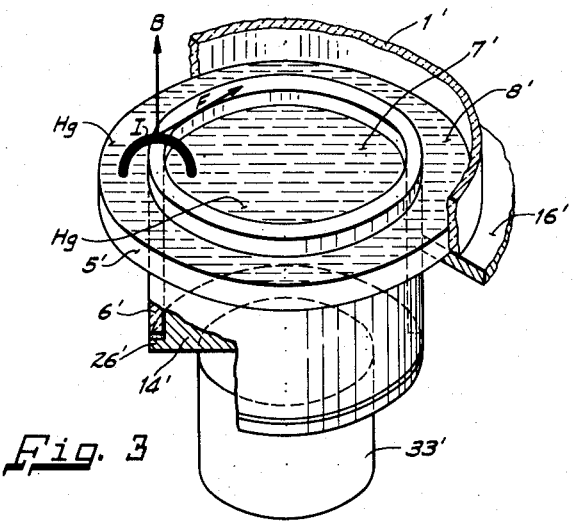
Fig. 3 is a perspective view schematically illustrating means utilized in the embodiment of Fig. 2 for preventing local heating of the insulating barrier between mercury pools.

As schematically illustrated in Fig. 3, the magnet 33 is so disposed in relation to the arc 1 that the magnetic lines of force emanating from the magnet have a component B which intersects the arc 1 at approximately right angles. Due to the force F exerted on a charged particle moving in a magnetic field, an electric motor action is produced on the arc 38 constituted by such charged particles which causes the arc 38 to rotate in a circular path around the upper edge of the insulating barrier 6, thereby preventing destructive local heating of the insulating barrier 6. In this embodiment the conductor member 14' is preferably of a stainless steel material exhibiting magnetic properties.

Figure 4:
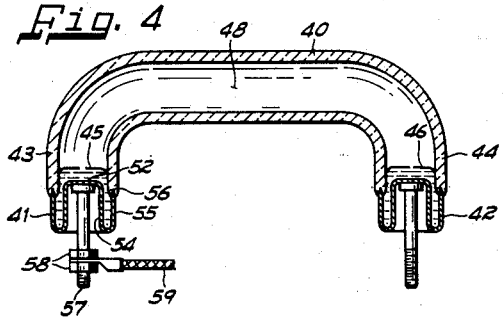
Figs. 4 and 5 are sectional views of still other alternative embodiments of the invention.

A third embodiment of the invention shown schematically in Fig. 4 comprises a generally U-shaped tube 40 of suitable insulating material such as glass having metallic conducting members 41 and 42 disposed in sealing relationship at the lower end of the depending hollow legs 43 and 44 respectively. Mercury disposed in each leg 43 and 44 in sufficient quantity to cover the conductor members 41 and 42 provides pool electrodes 45 and 46 insulated from each other and separated a predetermined distance in a manner similar to the pool electrodes 7 and 8 of the preferred embodiment. A gas 48, inert with respect to mercury, is disposed in the sealed chamber formed by the insulating tube 40 and the conductor members 41 and 42. Conductor members 41 and 42 are identical and only one will be described. Cylindrical conductor member 41 has a central planar portion 52 surrounded by a continuous, annular, channel portion defined by an inner wall 54 integral with and depending from the central portion 52 and an upwardly extending outer wall 55 spaced radially outwardly from the inner wall 54. The conductor member 41 is preferably of a metal alloy having approximately the same coefficient of expansion as the glass material of the insulating tube 40. The upper end of the outer wall 55 is tapered to a sharp edge 56, and after softening the lower edge of leg 43 by heating, the sharp edge 56 is pressed into the glass to form a fluid tight seal between insulating tube 40 and conducting member 41. The head of a terminal bolt 57 is secured by suitable means such as solder to the lower surface of central portion 52, and terminal bolt 57 may threadably engage means such as a pair of nuts 58 for securing one end of a conductor 59 leading to the device to be protected.

Figure 5:
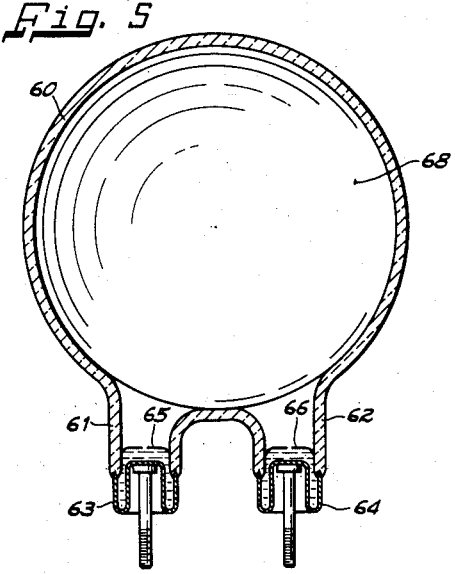

A still further embodiment of the invention shown schematically in Fig. 5 comprises a spherical envelope 60 having a pair of hollow, depending, open-ended legs 61 and 62 sealed by metallic conductors 63 and 64 disposed at the lower end of the depending legs 61 and 62. Conductors 63 and 64 are identical with conductors 41 and 42 described in connection with the embodiment of Fig. 4. Mercury filling each leg 61 and 62 to a point above the metallic conductors 63 and 64 provides mercury pool electrodes 65 and 66 insulated from each other and spaced a predetermined distance apart in a manner similar to the embodiment of Fig. 1. A gas 68, inert with respect to mercury, is disposed in the envelope 60 in fluid communication with the pool electrodes 65 and 66.

Although the invention has been illustrated and described with reference to a series capacitor protective device, it will be apparent that the improved protective device of the invention can be utilized in any electrical apparatus where it is desired to limit the voltage to a predetermined magnitude. For example, the invention is ideal for use as a low voltage lightning arrestor in that it is self clearing at the first half cycle after the fault voltage drops below that required to break down the low pressure gas within the sealed chamber.

While only a few embodiments of the invention have been illustrated and described, it will be apparent that many modifications and variations thereof will be obvious to those skilled in the art and, consequently, it is intended in the appended claims to cover all such modifications and variations which come within the true spirit and scope of the invention.

What I claim as new and desire to secure by Letters Patent of the United States is:

1. In a protective device, the combination of an envelope having a longitudinal axis which is disposed vertically, a tubular insulator coaxial with and disposed at the lower end of said envelope, a first conductor surrounding said tubular insulator between the inner wall of the envelope and said insulator, a second conductor disposed in the hollow portion of said insulating member, said insulator and said conductors forming a closure for said envelope, a first quantity of mercury disposed between said envelope and said insulator and covering said first conductor, a second quantity of mercury disposed inside the hollow portion of said insulator and covering said second conductor, said tubular insulator extending a predetermined distance above the surface of said quantities of mercury and electrically insulating said first quantity of mercury and said first conductor from said second quantity of mercury and said second conductor, the surface areas of said first and second quantities of mercury being substantially equal, and an inert gaseous medium disposed in said envelope above said mercury, whereby said protective device is self-clearing.

2. A device for protecting electrical apparatus from an overvoltage of relatively low magnitude, comprising, in combination, a hollow, sealed, cylindrical insulating envelope having a coaxial tubular insulating portion extending toward the interior of said envelope, a first mercury-containing electrode within said tubular portion, a second mercury-containing electrode between said tubular portion and the sidewall of said cylindrical envelope, said tubular insulating portion extending a predetermined distance above and insulating between said first and second electrodes, whereby the shortest arcing distance between said first and second electrodes is predetermined, an inert gaseous medium filling said envelope at a predetermined pressure below atmospheric and being in communication with said electrodes, and first and second conductor means each being in electrical contact with one of said electrodes and permitting electrical connection thereto from the exterior of said envelope, whereby said inert gaseous medium controls restriking of said protective device and said electrical apparatus is restored to operation after the potential across said protective device is reduced to approximately the said critical overvoltage which initially sparked over the gap between said first and second electrodes.

3. A protective device comprising a first reservoir having a first electrically conductive liquid pool electrode disposed therein, a second reservoir adjacent said first reservoir and having a second electrically conductive liquid pool electrode disposed therein, electrical insulating means disposed between and extending a predetermined distance above said electrodes insulating one from the other, an envelope enclosing said reservoirs, said envelope and said reservoirs forming a closed chamber common to said reservoirs, an inert gaseous medium disposed in said envelope and above said electrodes and being at a predetermined pressure below atmospheric, whereby a relatively low predetermined breakdown potential is provided between said first and second pool electrodes, and first and second conductor means permitting electrical connection thereto from the exterior of said envelope, each of said means providing electrical contact with the conductive liquid in one of said pool electrodes and being covered by said conductive liquid, and means for generating a magnetic field a portion of whose magnetic lines of force are transverse to the arc path across said insulating means and between said pool electrodes.

4. A device for protecting electrical apparatus from an overvoltage of relatively low magnitude, comprising, in combination, a hollow, sealed, cylindrical insulating envelope having a coaxial tubular insulating portion extending toward the interior of said envelope, a first mercury-containing electrode within said tubular portion, a second mercury-containing electrode between said tubular portion and the sidewall of said cylindrical envelope, said tubular insulating portion extending a predetermined distance above and insulating between said first and second electrodes, whereby the shortest arcing distance between said first and second electrodes is predetermined, an inert gaseous medium filling said envelope at a predetermined pressure below atmospheric and being in communication with said electrodes, first and second conductor means each being in electrical contact with one of said electrodes and permitting electrical connection thereto from the exterior of said envelope, and means for producing a magnetic field at least a portion of which is transverse to the shortest arc path between said mercury-containing electrodes.

5. In a protective device, the combination of an envelope having a longitudinal axis which is disposed vertically, a tubular insulator coaxial with and disposed at the lower end of said envelope, a first conductor surrounding said tubular insulator between the inner wall of the envelope and said insulator, a second conductor disposed in the hollow portion of said insulating member, said insulator and said conductors forming a closure for said envelope, a first quantity of mercury disposed between said envelope and said insulator and covering said first conductor, a second quantity of mercury disposed inside the hollow portion of said insulator and covering said second conductor, said tubular insulator extending a predetermined distance above the surface of said quantities of mercury and electrically insulating said first quantity of mercury and said first conductor from said second quantity of mercury and said second conductor, an inert gaseous medium disposed in said envelope above said mercury, and a permanent magnet disposed below said second conductor and coaxial with said insulating member.

References Cited in the file of this patent

UNITED STATES PATENTS

| | | |
|---|---|---|
| 969,336 | Butler | Sept. 6, 1910 |
| 1,007,770 | Butler | Nov. 7, 1911 |
| 1,288,460 | Adsit | Dec. 24, 1918 |
| 1,361,710 | George | Dec. 7, 1920 |
| 1,434,310 | Nienhold | Oct. 31, 1922 |
| 1,513,561 | Schroter | Oct. 28, 1924 |
| 1,630,233 | Buttolph | May 24, 1927 |
| 1,834,809 | Swann | Dec. 1, 1931 |
| 2,035,878 | Geffcken et al. | Mar. 31, 1936 |
| 2,352,992 | Von Henke | July 4, 1944 |